(12) United States Patent
Gould et al.

(10) Patent No.: US 8,322,311 B2
(45) Date of Patent: Dec. 4, 2012

(54) EXERCISING DOG LEASH WARN ON A USERS WRIST

(76) Inventors: Anna C Gould, Corona, CA (US); Jason Gould, Corona, CA (US)

(*) Notice: Subject to any disclaimer, the term of this patent is extended or adjusted under 35 U.S.C. 154(b) by 252 days.

(21) Appl. No.: 12/405,885

(22) Filed: Mar. 17, 2009

(65) Prior Publication Data

US 2009/0235873 A1 Sep. 24, 2009

Related U.S. Application Data

(60) Provisional application No. 61/070,655, filed on Mar. 24, 2008.

(51) Int. Cl.
*A01K 27/00* (2006.01)

(52) U.S. Cl. ......... 119/798; 119/795; 119/792; 119/797

(58) Field of Classification Search .............. 119/798, 119/712, 795, 769, 792, 770, 797, 793, 856, 119/772, 776, 863, 774, 787, 857; D30/153, D30/151, 144; 294/25, 140, 149, 150, 156, 294/167; 24/306, 442
See application file for complete search history.

(56) References Cited

U.S. PATENT DOCUMENTS

| | | | | |
|---|---|---|---|---|
| 649,832 | A * | 5/1900 | Furnivall | 16/405 |
| 2,911,947 | A * | 11/1959 | Kramer | 119/798 |
| 2,994,300 | A * | 8/1961 | Grahling | 119/770 |
| 3,099,250 | A * | 7/1963 | Soles, Jr. | 119/776 |
| 4,042,977 | A * | 8/1977 | Antonious | 2/161.5 |
| 4,729,345 | A | 3/1988 | Anderson | |
| 4,962,929 | A | 10/1990 | Melton, Jr. | |
| 5,038,718 | A * | 8/1991 | Pfleger | 119/654 |
| 5,161,486 | A | 11/1992 | Brown | |
| D337,395 | S * | 7/1993 | Erlinger et al. | D30/153 |
| 5,497,733 | A * | 3/1996 | Hull et al. | 119/793 |
| 5,706,764 | A | 1/1998 | Irbinskas | |
| 5,724,921 | A | 3/1998 | Bell | |
| 5,732,662 | A | 3/1998 | Jacobsen | |
| 5,842,444 | A | 12/1998 | Perrulli | |
| 5,915,336 | A * | 6/1999 | Watson | 119/797 |
| 6,000,979 | A * | 12/1999 | Stewart | 441/75 |
| 6,082,308 | A | 7/2000 | Walter | |
| 6,085,696 | A | 7/2000 | Fisher | |
| 6,095,093 | A | 8/2000 | Kisko et al. | |
| 6,330,961 | B1 * | 12/2001 | Borja | 224/222 |
| 6,553,944 | B1 | 4/2003 | Allen et al. | |
| 6,694,923 | B1 * | 2/2004 | Fouche | 119/792 |
| 6,932,027 | B1 * | 8/2005 | Whitney | 119/770 |
| 6,935,277 | B2 * | 8/2005 | Vaccari | 119/796 |
| D519,686 | S * | 4/2006 | Alameddine et al. | D30/153 |
| 7,044,080 | B2 | 5/2006 | Rabello | |

(Continued)

*Primary Examiner* — Andrea Valenti
(74) *Attorney, Agent, or Firm* — Kirk A. Buhler; Buhler & Associates

(57) ABSTRACT

Improvements in an animal leash are disclosed. The leash is present invention relates to a leash for an animal such as a dog that leaves the owners hands free. The leash is wrapped around the wrist of a user and includes a pocket for keys, money, ID and or credit card. The leash is made from a fixed rope or belting material or can be made from a stretchable or coiled material or a combination thereof. The leash is secured on the user with a removable fastening system that allows the user to adjust the diameter of the strap around their wrist to allow the user to jog or walk without holding the leash. The securing system can also be adjustable to different degrees of break-away force to prevent damage to a user or animal if the user or the tethered animal becomes stopped or restrained.

8 Claims, 3 Drawing Sheets

U.S. PATENT DOCUMENTS

| | | |
|---|---|---|
| 2002/0035968 A1* | 3/2002 | Prusia et al. .................. 119/792 |
| 2003/0150087 A1* | 8/2003 | Dieterich ........................ 24/306 |
| 2005/0229868 A1* | 10/2005 | Young, III ..................... 119/798 |
| 2005/0263103 A1 | 12/2005 | Updyke et al. |
| 2006/0027187 A1 | 2/2006 | Nicastro |
| 2006/0042562 A1* | 3/2006 | Wagner ......................... 119/792 |
| 2008/0216769 A1* | 9/2008 | LaCross ........................ 119/798 |
| 2009/0194038 A1* | 8/2009 | Burgett ......................... 119/770 |
| 2009/0320769 A1* | 12/2009 | McCay ......................... 119/798 |

* cited by examiner

EXERCISING DOG LEASH WARN ON A USERS WRIST

CROSS REFERENCE TO RELATED APPLICATION

This application claims the benefit of U.S. Provisional 61/070,655 filed Mar. 24, 2008 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a dog leash. More particularly, the present invention relates to a leash for an animal such as a dog that leaves the owners hands free. The leash is wrapped around the wrist of a user and includes a pocket for keys, money, ID and or credit card. The leash is fixed material, stretchable or a combination thereof.

2. Description of Related Art Including Information Disclosed Under 37 CFR 1.97 and 1.98

Most dog leashes are designed for a user to maintain control over the dog while they are walking their dog. When a person is exercising, as in running or jogging, the dog typically stays is close proximity to the user but still needs to be tethered to the owner. When running or jogging the leash still needs to be held or secured to the person exercising. Grasping a leash can be difficult or awkward while one is moving their arms as they run or jog. Several patents have been issued on dog leashes for exercising or leaving the owner's hands free as they exercise. Exemplary examples of some of these patents are disclosed herein.

U.S. Pat. No. 5,161,486 issued to Steve M Brown on Nov. 10, 1992 and U.S. Pat. No. 5,842,444 issued to Joseph T. Perrulli on Dec. 1, 1998 disclose hands free dog leashes. Both of these leashes wrap around the waist of the user like a belt and the leash extends from the belt. While these patents disclose a dog leash that the user does not have to hold the user does not have any control of the leash and can be tripped with the leash since it can hang near the runners' legs whereas a leash around the users' wrist provides greater control over the leash and the dog. A waist belt also can interfere with breathing and does not provide air movement under the belt to reduce sweating.

U.S. Pat. No. 6,095,093 issued to Mary Kisko et al., on Aug. 1, 2000 discloses a leash where the leash assembly is secured to the upper arm of a user. While the leash assembly provides a means of tethering a dog without holding a leash, securing the leash to an upper arm could slide on the arm and requires a wide pad to distribute forces from the leash.

U.S. Pat. No. 4,729,345 issued to Sharon K. Anderson on Mar. 8, 1988 and U.S. Pat. No. 6,553,944 issued to Virginia A. Allen et al., on Apr. 29, 2003 disclose wrist warn leash inventions. For Anderson the wrist connection is with intersecting loops where each loop is closed with a hook and loop type fastener. While these patents disclose a leash that is secured to a wrist they do not provide for a storage pocket or a hybrid leash.

What is needed is a leash with a wrist securing connection where the wrist strap includes a storage pocket and the leash is a hybrid to allow the leash to extend if required to allow a dog to run around obstacles that the owner might not see. The proposed exercising dog leash provides these features.

BRIEF SUMMARY OF THE INVENTION

It is an object of the exercising dog leash is to provide a pocket in the wrist strap. The pocket allows a person to store small items that they might need while they are away from home. The items that can be stored include but are not limited to keys, money, ID and or credit card. These items can be accidentally dropped or fall if they are not secured. The pocket would have a closure that locks the items inside the pocket to prevent accidental loss.

It is another object of the exercising dog leash for the leash to be adjustable on the wrist to accommodate different size wrists and comforts. The ideally the wrist strap would be loosely fit onto a wrist to allow the strap to move slightly to allow for ventilation of the area under the strap. The wrist strap would be adjusted such that it is not so loose that it would slide off a person's wrist and not be so tight to prevent proper blood circulation. Placement on the user's wrist allows a user to quickly grasp the leash if they need to gain quick control of their dog. The inside of the wrist strap is lined with a soft water resistant material that provides comfort without causing abrasion or sweat collection.

It is another object of the exercising dog leash is to make the wrist strap retention mechanism adjustable for an emergency break-away. The break-away feature allows the wrist strap to freely separate from the users wrist if the tension exceeds a threshold. This feature is useful if a dog passes on one side of a pole while the runner passes on the other side of a pole. This is simply accomplished by using multiple snaps or hooks and loop securing straps.

It is still another object of the exercising dog leash is to provide a hybrid leash where a portion of the leash is extendable with coiled or elastic material. The hybrid leash allows the dog and runner to separately choose a running path without being restrained with a short leash or being tripped with a long leash. A portion of the hybrid leash is a fixed length to allow an owner to maintain control over their dog. The hybrid leash provide the best of both a long and short leash Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
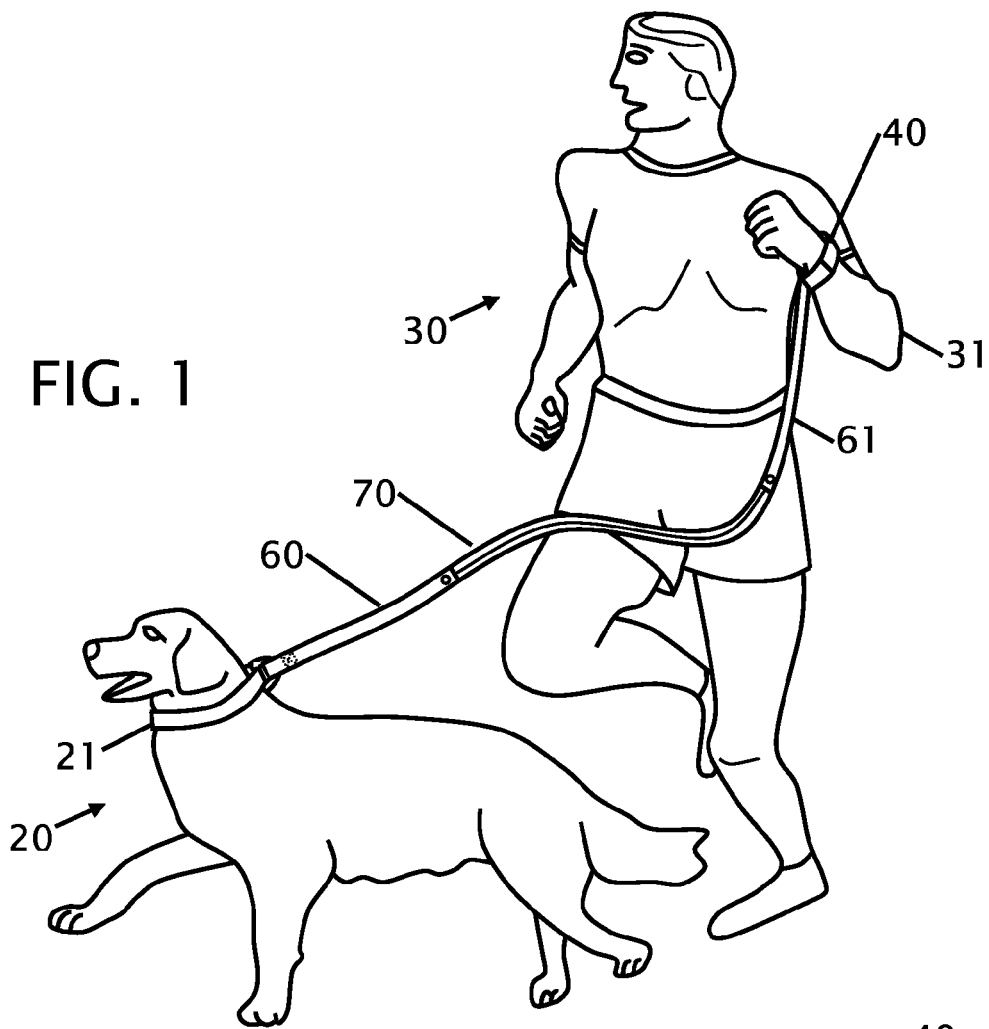
FIG. 1 shows a perspective view of a person jogging or running with the exercising dog leash attached to the jogger or runner's wrist.

FIG. 1 shows a perspective view of a person 30 jogging or running with the exercising dog leash attached to the jogger or runner's wrist. The leash clips to a standard collar 21 of a dog 20. The collar 21 wraps around the neck of the dog 20 to maintain control over the dog and keep the dog in relatively close proximity to the jogger 30 while they both move along a road, highway, trail or other path. One contemplated and preferred embodiment of the connecting mechanism of the leash 60 to the dog collar is shown and described in more detail in FIG. 2 herein. A wrist strap 40 is secured and securable on the wrist of a user 30. The wrist strap 40 is made for a light weight flexible material that is not harmed by perspiration and is securable to the arm 31 of the person 30 exercising with the dog 20. Detailed views of embodiments of the wrist strap are shown and described in more detail in FIGS. 2-4. Locating the wrist strap and leash on the wrist of a user allows the user to quickly gain control of the dog in an emergency situation but also leaves the hands free for more natural running movement. The leash shown in this figure extends from the wrist strap 40 to the dog collar 21 through a leash made from a single material of leather, fabric, rope or cloth to a leash (as shown) made from a hybrid of straps 60, 61 with an elastic member 70 placed between the two strap members 60 and 61. A variety of hybrid members 70 are shown and described in more detail with FIGS. 5-7 herein.

Figure 2:
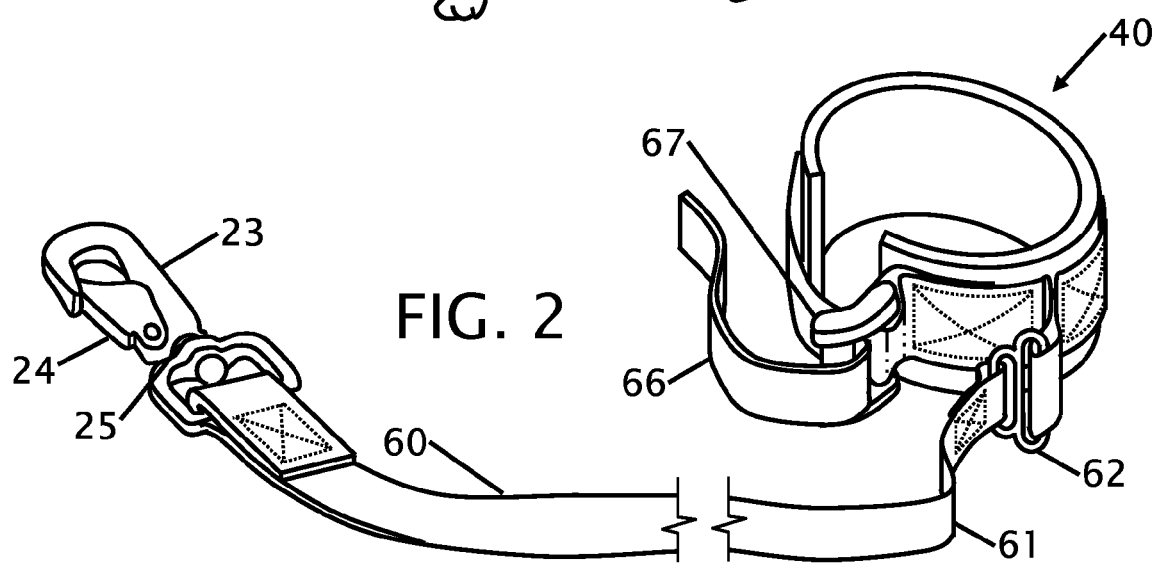
FIG. 2 shows a perspective view of the wrist strap and the collar latch.

FIG. 2 shows a perspective view of the wrist strap and the collar latch. In the preferred embodiment the dog collar retaining mechanism is a self closing clip having a hook portion 23 with a closure 24 that closes the hook 23 to prevent the latch from accidentally dislodging from the dog collar. The hook portion 23 ideally clasps to a ring on the dog collar, but may also clasp onto a metal or fabric dog collar or rope tied around the dog's neck. The hook 23 connects to the leash 60 through a rotatable buckle 25 that allows the leash to rotate freely on the hook 23. The leash is shown as a flat type belting material, but other materials are contemplated such as rope or leather that provides equivalent functionality. While this embodiment shows a single belt 60 in the beginning and the end 61 portions, it is contemplated that between these two sections the leash may be adjustable for length depending upon the desired length of the leash, the amount of control over the dog or the preferences of the user. Some of these adjustable length options are shown and described in more detail with FIGS. 5-7. Another contemplated embodiment is with double rings, "D" rings or an adjustable strap as might be found on a shoulder strap or belt to adjust the length of the leash. The leash portion 61 is secured into the wrist strap 40 with a connecting buckle 62.

The wrist strap 40 has a flexible inner cushioning member 41. This flexible cushioning member 41 is preferably a neoprene material that provides a cushion from the strap 61 and moisture protection to the leash material 60. Belting material connects through connecting buckle 62 to connect the leash to the flexible inner cushioning member 41. In the embodiment shown the belting material around the flexible inner cushioning member 41 is retained on the wrist of a user by passing strap 66 through buckle 67. The opposing sides of strap 66 have hook and loop type material that allows the strap 66 to connect to itself in a variety of positions to accommodate wrists of different size users.

Figure 3:
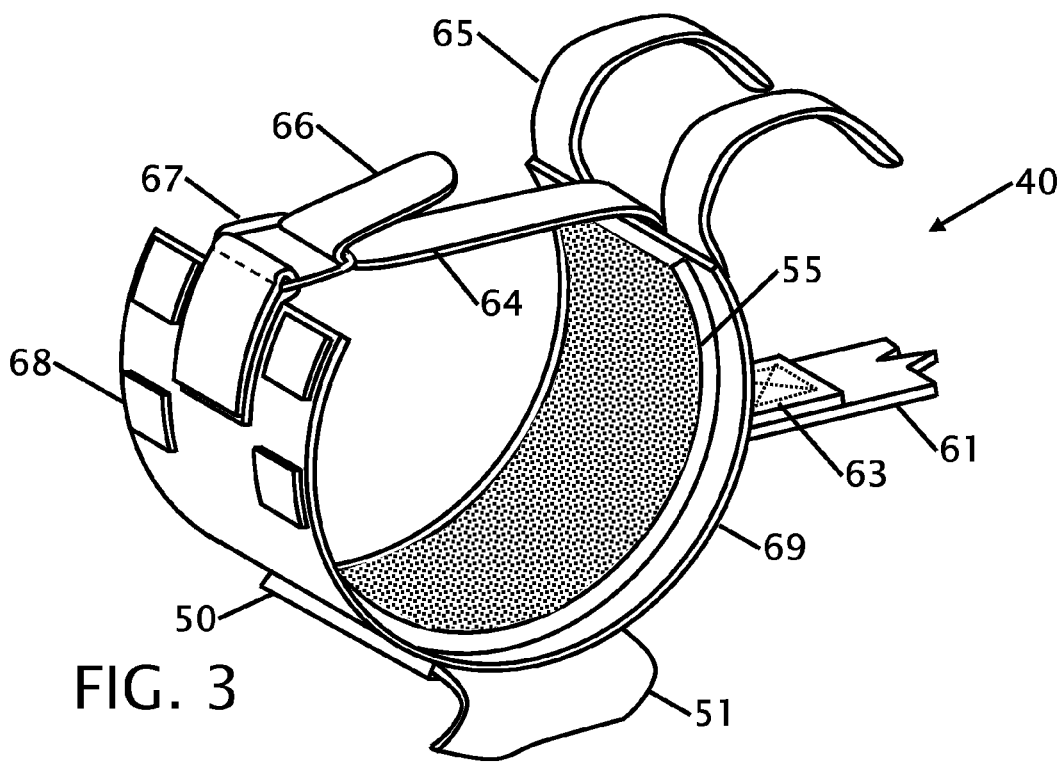
FIG. 3 shows a perspective view of the showing the securing portion of the wrist strap.
Figure 4:
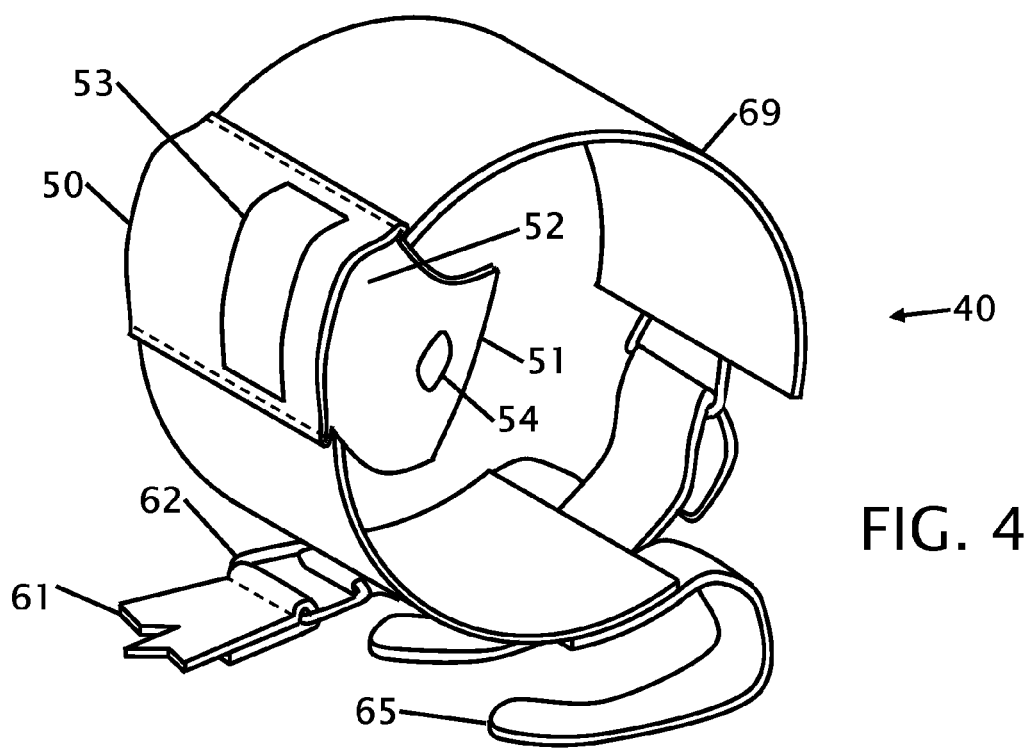
FIG. 4 shows a second perspective view of the wrist strap showing the storage pocket or pouch.

FIG. 3 shows a perspective view of the showing the securing portion of the wrist strap 40. FIG. 4 shows a second perspective view of the wrist strap 40 showing the storage pocket or pouch 50. In FIG. 3 the buckling portion of the wrist strap is most closely shown. This embodiment has three separate straps 64 and 65. The purpose of the different securing methods allows a user to adjust the breakaway load on the leash 61, as it is connected 63 to the wrist strap 69, to allow an excessive amount of load on the wrist strap 40 to open. A cushioning pad 55 exists on the inside of the wrist strap 69 to reduce skin abrasion. This is particularly important if a jogger and dog take separate paths around an object such as a tree, light pole or fire hydrant. In the embodiment shown in FIG. 2 the securing method might not allow the wrist strap to separate from the jogger, whereas using just one of the hook and loop fasteners 68 from FIG. 3 with just one strap 65 would allow the wrist strap 40 the remain on a user under normal exercising, but also allow the wrist strap to open if the load on the leash 61 became excessive. Strap 64 passes through ring 67 to allow the end 66 of the strap to be secured to the first part of strap 64. In FIG. 3 the flap 51 closure for the pocket 50 is shown. The pocket 50 is shown in greater detail with FIG. 4.

From FIG. 4 the pocket is shown with the flap 51 open showing the opening 52 of the pocket 50. It is contemplated that the pocket is sufficiently sized to accommodate items including but not limited to credit cars, money, bags, Identification keys or similar items. The pocket is shown in a horizontal orientation, but it is also contemplated that the pocket can be oriented in a vertical orientation and the closure flat 51 can be placed on the elongated side as opposed to the narrow side. While only one pocket is shown and described more than one pocket is contemplated as well as a secret pocket inside the wrist strap 40. In the preferred embodiment the closure is with hook and loop fasteners 53, but other closures are contemplated including but not limited to a zipper, snap, or magnetic clasp 54. From this view the connecting buckle 62 and the attachment of the leash 61 is also shown.

Figure 5:
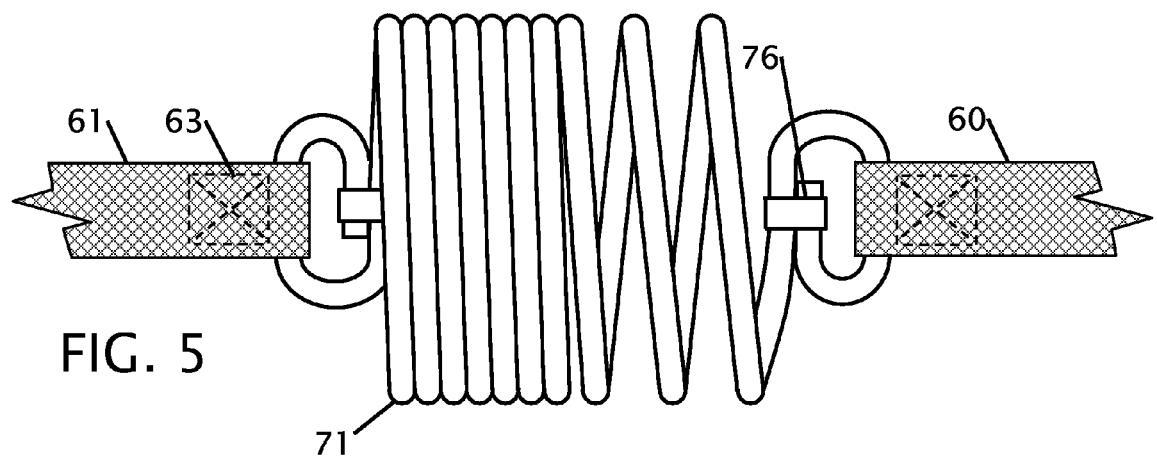
FIG. 5 shows a first preferred embodiment of the hybrid portion of the leash.

FIG. 5 shows a first preferred embodiment of the hybrid portion of the leash. The opposing ends 60 and 61 of the leash are shown extending off the sides of the Figure. In this Figure the hybrid section is a coiled member 71 that is secured to each sewed 63 end of the leash using a ferrule 76 or similar securing mechanism. The coiled member 71 is preferably made from a memory type plastic or metal material that allows the two ends of the leash to be pulled apart and the coiled member 71 pulls the leash ends back together. The coiled member 71 provides for a significant amount of elongation without requiring a long leash that the jogger or the dog could get tangled into.

Figure 6:
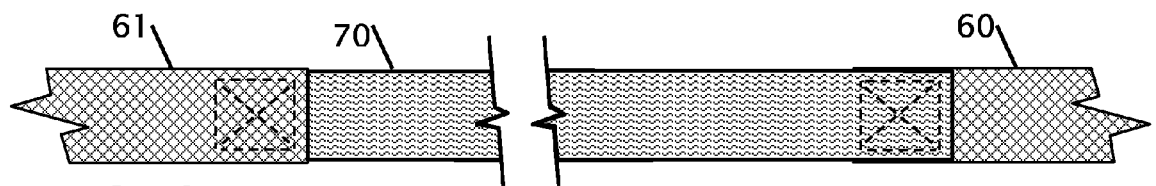
FIG. 6 shows a second preferred embodiment of the hybrid portion of the leash.

FIG. 6 shows a second preferred embodiment of the hybrid portion of the leash. In this second embodiment an elastic or elastomeric member 70 is sewn between the two ends 60 and 61 of the leash. The elastic member allows for some stretching of the length of the leash while still providing a fairly short length leash. In general the elastic portion 70 can stretch 1 to three times its length.

Figure 7:
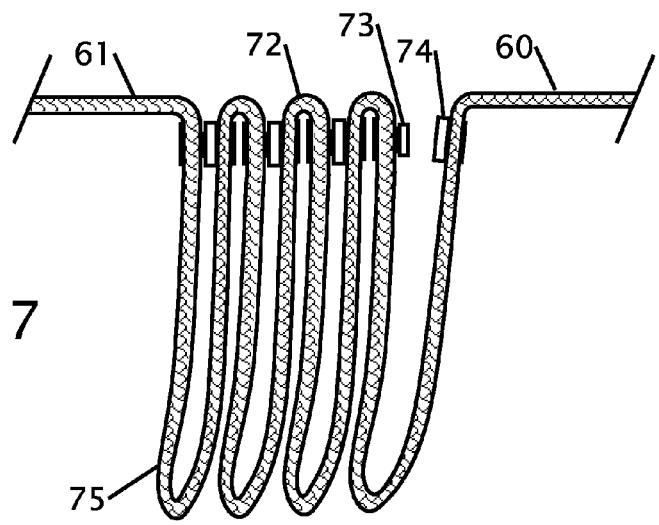
FIG. 7 shows a third preferred embodiment of the hybrid portion of the leash.

FIG. 7 shows a third preferred embodiment of the hybrid portion of the leash where the entire length of the leash is made from belting material and a series of snaps having a male 73 and female 74 snap pieces installed along the leash 60, 61. The snaps allows the leash to be shortened with loops 72 and 75 of leash material allowing the leash to be extended without constant elastic or spring pulling forces on the ends 60 and 61 of the leash. It is also contemplated that the snaps can be with hook and loop type fasteners.

Thus, specific embodiments of an exercising dog leash warn on a users wrist has been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An exercising dog leash comprising:
a temporally securable wrist strap secured to a leash whereby said temporally securable wrist strap allows for hands free retention of said leash;
said leash is an elongated member extending from said wrist strap;
a temporally securable coupling configured to temporally secure to a ring or strap of a collar;
an adjustment mechanism on said wrist strap that adjustably secures said wrist strap onto a user with a plurality of separate straps that can be individually and separately secured to adjust the amount of force required to open said wrist strap from said user, and
wherein said leash includes an extendable portion and a fixed length portion wherein said extendable portion has a plurality of hook and loop fasteners in series creating a plurality of equal length loops along said leash extendable portion only to allow the fixed length portion of the leash to be adjustable wherein excessive force applied between said collar and said wrist strap secured to said user individually dislodges said series of hook and loop fasteners to extend a length of said leash based upon said excessive force.

2. The exercising dog leash according to claim 1 wherein said wrist strap further includes a pocket.

3. The exercising dog leash according to claim 1 wherein said pocket further includes a zipper closure.

4. The exercising dog leash according to claim 1 wherein said pocket further includes a closable flap.

5. The exercising dog leash according to claim 1 wherein said closable flap is secured with a hook and loop fastener.

6. The exercising dog leash according to claim 1 wherein said closable flap is secured with a magnetic clasp.

7. The exercising dog leash according to claim 1 wherein said temporally securable coupling further includes a rotatable buckle.

8. The exercising dog leash according to claim 1 wherein said wrist strap further includes a cushioning pad.

* * * * *